US006884284B1

(12) United States Patent
Jensen (10) Patent No.: US 6,884,284 B1
(45) Date of Patent: Apr. 26, 2005

(54) APPARATUS FOR RECTIFICATION OF LIQUID MIXTURES AND/OR FOR . . .

(76) Inventor: Erik Jensen, Frændevej 27, DK-2860 Søborg (DK)

( * ) Notice: Subject to any disclaimer, the term of this patent is extended or adjusted under 35 U.S.C. 154(b) by 0 days.

(21) Appl. No.: 09/914,771

(22) PCT Filed: Mar. 1, 2000

(86) PCT No.: PCT/DK00/00086

§ 371 (c)(1),
(2), (4) Date: Sep. 4, 2001

(87) PCT Pub. No.: WO00/51702

PCT Pub. Date: Sep. 8, 2000

(30) Foreign Application Priority Data

Mar. 1, 1999 (DK) ........................................ 1999 00272

(51) Int. Cl.$^7$ ............................................... B01D 47/06
(52) U.S. Cl. .............................. 96/281; 96/283; 95/218
(58) Field of Search .............................. 95/218; 96/281, 96/282, 283, 284, 285, 287; 261/92; 202/136, 216, 238; 159/9.1, 10, 11.1, 11.3

(56) References Cited

U.S. PATENT DOCUMENTS

| 206,736 | A | * | 8/1878 | Kirkham et al. |
| 261,551 | A | * | 7/1882 | Isbell |
| 282,994 | A | * | 8/1883 | Laycock et al. |
| 388,903 | A | * | 9/1888 | Morava |
| 406,124 | A | * | 7/1889 | Chandler, Sr. et al. |
| 407,025 | A | * | 7/1889 | Mitchell |
| 551,694 | A | * | 12/1895 | Slocum |
| 574,683 | A | * | 1/1897 | Holmes |
| 1,538,335 | A | * | 5/1925 | Koehler |
| 1,704,663 | A | * | 3/1929 | Noden |
| 1,844,942 | A | * | 2/1932 | Buttfield |
| 2,698,287 | A | * | 12/1954 | Bowden et al. |
| 2,871,250 | A | * | 1/1959 | Eckey |
| 3,353,337 | A | * | 11/1967 | Gale |
| 3,880,623 | A | * | 4/1975 | Aoyama |
| 4,037,653 | A | * | 7/1977 | Meissner et al. |
| 5,171,486 | A | * | 12/1992 | Penno |

FOREIGN PATENT DOCUMENTS

| DE | 1 054 421 | 4/1959 |
| DK | 1989 03726 | 7/1989 |
| EP | 0494154 B1 | 7/1992 |
| SU | 154463 | 4/1987 |
| WO | WO 91/01784 | 2/1991 |
| WO | WO 97/18023 | 5/1997 |

* cited by examiner

Primary Examiner—Duane S. Smith
(74) Attorney, Agent, or Firm—Browdy and Neimark, P.L.L.C.

(57) ABSTRACT

An apparatus for rectification liquids and/or for scrubbing of gases has an elongated, horizontally extending, cylindrical process chamber or housing. A liquid and a gaseous phase are passed counter-currently through the apparatus. The liquid is thrown outwardly towards the peripheral housing wall by a rotor extending along the bottom of the housing. Liquid flowing downwards along the peripheral housing wall is collected in an upwardly open channel and the liquid collected therein may be supplied to the rotor via an adjustable slot or opening. Transversely extending, axially spaced guide plates are arranged within the housing so as to define a tortuous path for the gas phase flowing through the housing.

13 Claims, 5 Drawing Sheets

the volume of the vapour flowing through the apparatus. The adverse result is that liquid droplets being thrown radially outwardly adjacent to an outlet for remanence come into contact with vapour having a relatively high content of the volatile component, and due to the equilibrium between the two phases the remanence will have a higher content of the volatile component than necessary. It is true that the evaporated vapour being exhausted through a vapour outlet at the other end of the apparatus adjacent to the inlet of the raw product to be processed has a high content of the volatile component. However, when it is mixed with re-circulated vapour the concentration of the volatile component of the distillate is reduced.

APPARATUS FOR RECTIFICATION OF LIQUID MIXTURES AND/OR FOR …

REFERENCE TO RELATED APPLICATIONS

The present application is the national stage under 35 U.S.C. 371 of international application PCT/DK00/00086, filed Mar. 1, 2000 which designated the United States, and which international application was published under PCT Article 21(2) in the English language.

BACKGROUND OF THE INVENTION

1. Technical Field of the Invention

The present invention relates to an apparatus for rectification of liquid mixtures and/or for scrubbing of gases.

2. Prior Art

Apparatuses for rectification of liquid mixtures and apparatuses for scrubbing of gases function in principle in the same way, namely by causing the atomised liquid and the gas phase to flow counter-currently and thus to come into mutual contact. The reason why apparatuses for rectification and apparatuses for gas scrubbing have usually been built differently is that the reaction between the gas and the liquid phases is different in the two kinds of apparatuses. In rectification heat and substance is transferred between liquid and vapour when the heat transmission coefficient is high. For high viscosity mixtures, however, a high atomising velocity is necessary. In gas scrubbing the washing liquid in an atomised condition and the gas to be purified are caused to flow counter-currently at a high velocity. It has been found, however, that the solid particles entrained by the gas may avoid to come into contact with liquid and to be removed from the gas when the velocity of the liquid droplets is relatively low. In gas scrubbing centrifugal pumps are usually used for atomising liquid which is re-circulated. Because it is rather complicated to use a plurality of scrubber stages, usually only a single stage is used, and then the gas being discharged from the scrubber has only been in contact with a relatively dirty liquid, which has not been utilised at an optimum.

WO 97/18023 comprises an apparatus including a rotative heat transmission body for evaporating liquids or drying pumpable products. The apparatus comprises a scraper for continuously scraping solid deposits from the evaporation surface of the rotating heat transmission body. It has been found that when such a rotative heat transmission body is used for treating a mixture of liquid having different boiling points and a rotating atomising device is used for throwing droplets on to the evaporation surface of the heat transmission body, a rotating movement is also imparted to the vapour generated. Consequently, an exact counter-current movement between the two phases can not be obtained, and this is necessary to obtain an efficient rectification or scrubbing.

WO 91/01784 discloses an apparatus for rectification and gas scrubbing. Liquid is repeatedly thrown through the gaseous phase against an inner peripheral heat transmission surface. Spraying or atomising the liquid by means of a rotor causes a pressure reduction where the liquid droplets leave the rotor and a corresponding pressure increase where the droplets are stopped. The pressure difference so created may partly be equalised by transverse gas flows at the end walls of the processing chamber and by a resulting axial flow within the apparatus impairing the efficiency of the apparatus.

The pumping effect caused by the liquid droplets being thrown radially outwardly by the atomising rotor is volumetrically far greater than …

OBJECT AND SUMMARY OF THE INVENTION

The calculation of the dimensions of an apparatus is normally based on a vapour flow rate of about 1 m/sec. When, for example, the specific weight of the vapour phase is 1 kg/m$^3$ a pressure difference of only 0.05 kg/m$^2$ and 0.82 kg/m$^2$ (equal to 0.82 mm water column) is necessary for obtaining a vapour flow rate of about 1 m/sec. and 4 m/sec., respectively. Thus, a very small pressure increase may cause a substantially re-circulation of the vapour whereby the efficiency is reduced. Therefore, it would be advantageous to be able to obtain a more efficient control of the vapour flow through the apparatus.

This problem is solved by the present invention. Thus, the present invention provides an apparatus for rectification of liquid mixtures and/or for scrubbing of gases, said apparatus comprising an elongated processing chamber extending in a substantially horizontal direction, means for supplying liquid into the processing chamber at a first end thereof, means for discharging liquid from the processing chamber at an opposite second end thereof, liquid application means, which may, for example, include a rotor, extending along at least a major part of the length of the chamber for repeatedly throwing supplied liquid transversely to the longitudinal axis of the processing chamber, means for supplying gas into the processing chamber at said second end, and means for discharging gas from the processing chamber at said first end so as to obtain a generally counter-current movement of liquid and gas through the processing chamber, and the apparatus according to the invention is characterised in that the processing chamber is divided into interconnected sections or stages by means of a plurality of guide plates each extending across a major part of the cross-section of the processing chamber.

The guide plates provided in the apparatus according to the invention counteract the undesired axial re-circulation of gas phase due to the small radial pressure difference caused by the liquid being thrown radially outwardly towards the inner wall of the processing chamber as explained above. Thus, the guide plates render it possible to obtain a stepwise, controlled axial flow of the gas phase.

The processing chamber is preferably defined by a peripheral wall, such as a horizontally extending cylindrical wall, and a pair of opposite end walls. Preferably, at least one of the end walls comprises a releasable end wall part covering an opening, which is defined in the upper part of the end wall, said opening have dimensions sufficient to allow insertion of guide plates into the chamber through such opening. The opening in the end wall may be used not only as a usual man hole, but also for inserting guide plates into and removing guide plates from the processing chamber, whereby the apparatus may be adapted to perform a desired task at an optimum.

The releasable end wall part covering said opening may be releasably fastened to the respective end wall in any suitable manner. In the preferred embodiment, however, the releasable end wall part is in the form of a cover with a flange, which may be connected to the end wall by screws or bolts. The guide plates may be fastened in position within the processing chamber in any suitable manner, for example by welding. In order to facilitate changes in the arrangement of guide plates the inner peripheral wall of the processing chamber may comprise means for releasably fastening the guide plates at any of axially spaced, predetermined positions. Such releasable fastening means may, for example, comprise annular flanges fastened to and extending radially inwardly from the inner peripheral chamber wall. Thus, a larger number of such predetermined positions may be prepared even though only a smaller number thereof are normally used.

The liquid application means or device may comprise a rotor defining a plurality of liquid collecting pockets or chambers opening in the direction of rotation. Such pocket may have a U-shaped cross-section and the width of the opening, the depth of the pocket and the inclination of the side surfaces of the U-shape may then be selected so as to obtain the desired performance.

The rotor may be arranged at the bottom of the processing chamber where liquid having been thrown against the peripheral wall of the processing chamber be collected for recirculation. The lower part of the rotor may then dip into the liquid. This may, however, cause undesired vibrations of the liquid. In the preferred embodiment the liquid application means comprise a liquid receiving chamber for receiving liquid flowing downwards along the inner peripheral wall of the processing chamber, the receiving chamber communicating with the liquid channel via an adjustable, longitudinally extending opening or slot. In this manner the flow of re-circulated liquid to the rotor may be controlled and stabilised. The liquid receiving chamber, may for example, be defined between the peripheral inner wall of the processing chamber and a flap or plate member, which is pivotal about a longitudinal axis so as to allow adjustment of a space defined between the lower edge of the flap member and the adjacent part of the inner wall of the processing chamber. This allows for the desired control of the liquid supply in a very simple manner. The flap or plate member and the adjacent part of the peripheral wall may define an upwardly open liquid collecting channel allowing for the desired axial transport of liquid through the processing chamber.

The guide plates may be shaped and arranged in any suitable manner preventing the undesired axial gas flow due to the pressure difference caused by the liquid being thrown by the rotor as explained above. Thus, consecutive guide plates may be formed and arranged so as to force gas flowing from the gas supplying means to the gas discharge means to follow a tortuous path and to flow in opposite, transverse directions. As an example, axially spaced consecutive guide plates may extend from opposite sides of the chamber in overlapping relationship. Alternatively, the guide plates may comprise annular plates each defining a central opening and intermediate plates, each of which is positioned between a pair of annular guide plates and covers the central openings.

At least some of the guide plates may define or comprise conduits for heating or cooling fluid, whereby they may function as heating or cooling panels.

In order to remove precipitated solid matter or solid matter formed in any other way the apparatus may further comprise conveyor means for removing such solid matter separated in the processing chamber from the bottom part thereof. Such conveyor means may, for example, comprise a screw conveyor including a cylindrical housing communicating with the lower part of the processing chamber.

BRIEF DESCRIPTION OF THE DRAWINGS

The invention will now be further described with reference to the drawings, wherein FIGS. 4a and 4b illustrate details of the apparatus.

DETAILED DESCRIPTION OF THE PREFERRED EMBODIMENT(S) OF THE INVENTION

The embodiments of the apparatus according to the invention shown in the drawings comprise a preferably cylindrical housing 1 having a substantial horizontal, longitudinal axis. A liquid application device or atomising device 2a is arranged within the housing and includes a rotor 2 rotatably journalled in housing end walls 3 at the bottom of the housing. The lower part of the end walls 3 is formed as an integral part of the housing, while the upper parts of the housing end walls are in the form of covers 4 which may be bolted or otherwise releasably fastened to flanges 6. The end covers 4 are provided with a vapour inlet 10 and a vapour outlet 11. The vapour inlet 10 may be connected to an evaporator section (not shown) and the vapour outlet at the opposite end may be connected to a condenser (not shown) or possibly to the suction side of a heat pump. The housing 1 is divided into sections or chambers by means of axially spaced guide plates 7, 8 or 9. The end openings covered by the covers 4 have dimensions allowing the guide plates to be inserted into the housing 1 therethrough. This means, that the apparatus may be tested without guide plates, and that the guide plates may subsequently be mounted. The openings covered by the covers 4 may also serve as ordinary manholes.

Figure 3:
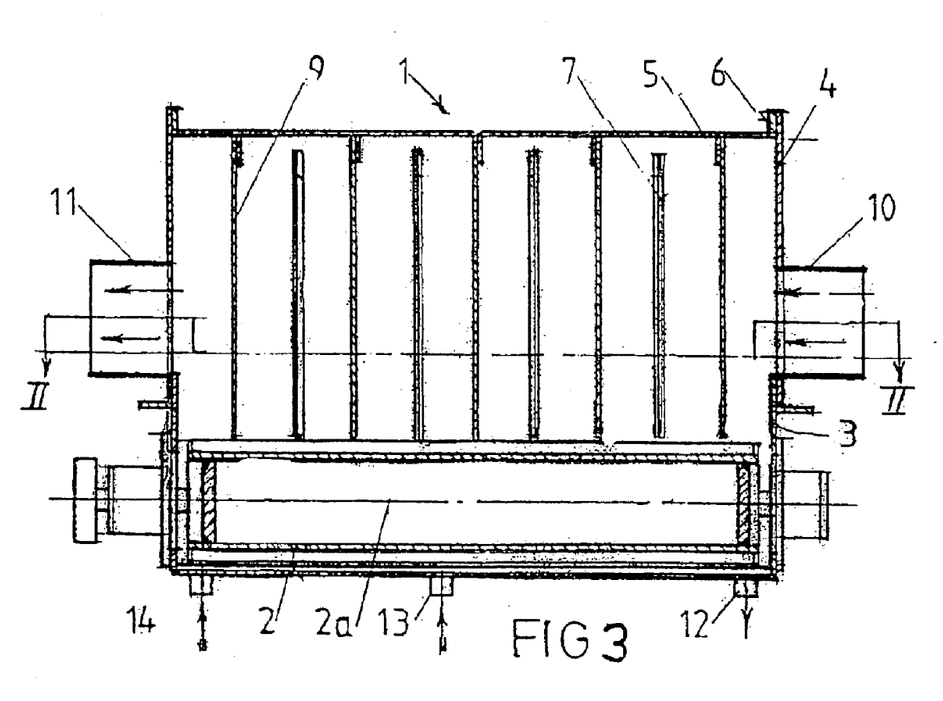
FIG. 3 is a vertical sectional view of the embodiment shown in FIGS. 1 and 2a, FIG. 4 is a cross-section of an embodiment having a conduit for a cooling or heating medium arranged on a guide plate.

As shown in FIG. 3, an inlet 14 for a raw liquid product to be treated is arranged at the bottom of the housing 1 at the end of the housing, which is provided with the vapour outlet. An outlet 12 for remanence is arranged at the bottom of the container at its opposite end. In case reflux is used the reflux may be supplied through the inlet 14 and the raw product to be treated may then be supplied through an inlet 13 positioned between the inlet 14 and the outlet 12.

Figure 1:
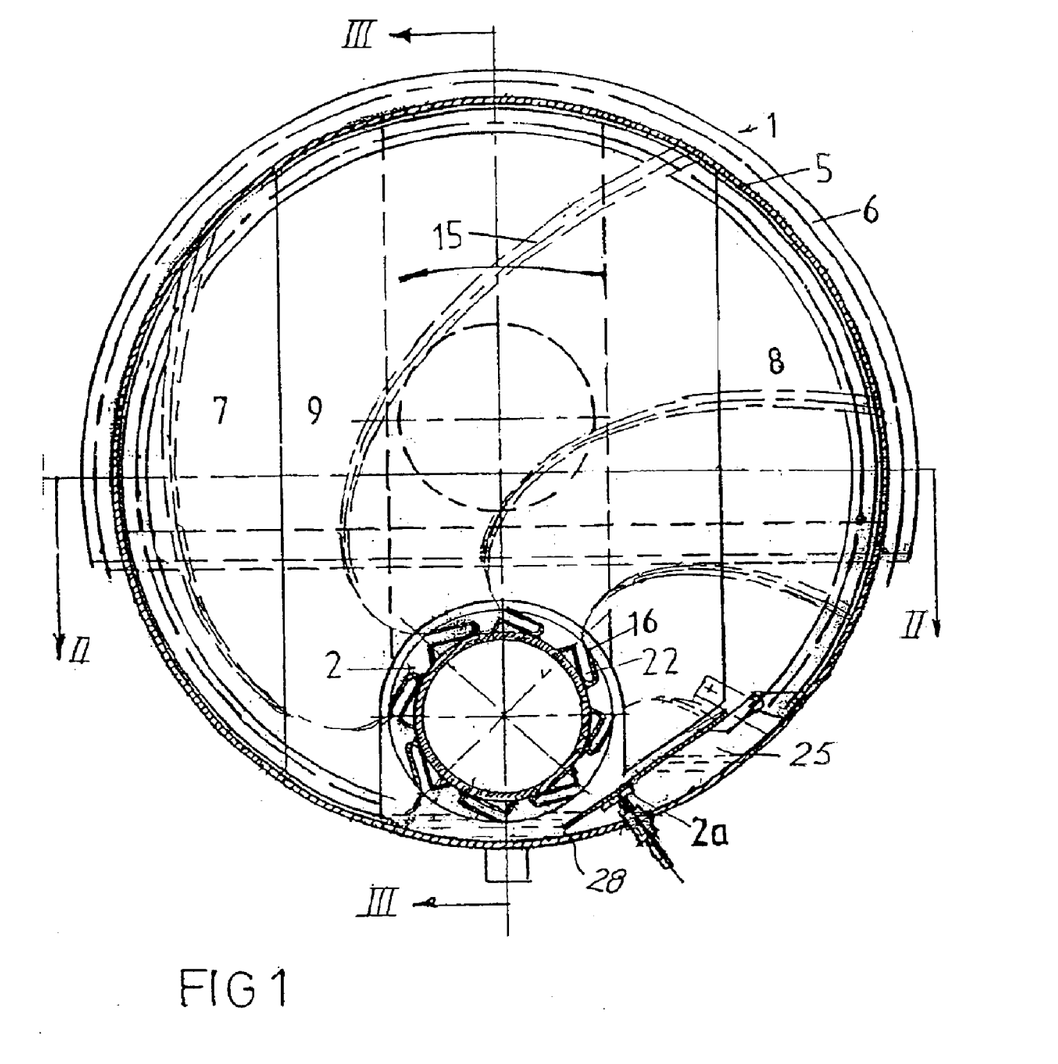
FIG. 1 is a cross section of an embodiment of the apparatus according to the invention.

In the embodiment shown in FIGS. 1, 2a and 3, the guide plates comprise axially spaced pairs of plates 7 and 8 extending from opposite sides of the peripheral wall 5 of the housing and defining a central opening there between. A vertical, substantially rectangular guide plate 9 is arranged between consecutive pairs of guide plates 7 and 8 so as to cover and extend transversely beyond the central openings defined by the plates 7 and 8. Openings are defined between the peripheral housing wall 5 and the opposite sides of each guide plate 9. The area of the opening defined between each pair of plates 7 and 8 is preferably substantially the same as the combined areas of the openings defined on opposite sites of each guide plate 9 and of the cross-sectional area defined between consecutive, axially spaced guide plates.

Liquid droplets being thrown out from the atomising rotor 2 define carpet-like patterns 15. The thrown out droplets obtain a velocity and direction being the sum of the vector defining the peripheral velocity of the rotor and the vector defining the rate at which the liquid flows across the outer edge 16 of a rotor pocket 22. From this position the liquid will continue in the said direction towards the peripheral housing wall 5. On this basis it may be calculated how long time it will take before a droplet reaches the inner surface of the peripheral wall 5 and how much the angular position of the rotor has changed in this time period. By such calculations the inner and outer ends or the carpet-like pattern 15 may be determined. Intermediate points of the pattern may be calculated in the same manner, but further factors are influencing the shape of the pattern. Therefore, the droplet patterns 15 illustrated in FIG. 1 are based on observations made when exposed to stroboscopic light. It is then possible clearly to watch the development of the process within the processing chamber and the varying volumes defined between the rotating carpet-like patterns 15 of droplets, and the need for a controlled axial flow of the vapour is evident.

Figure 2:
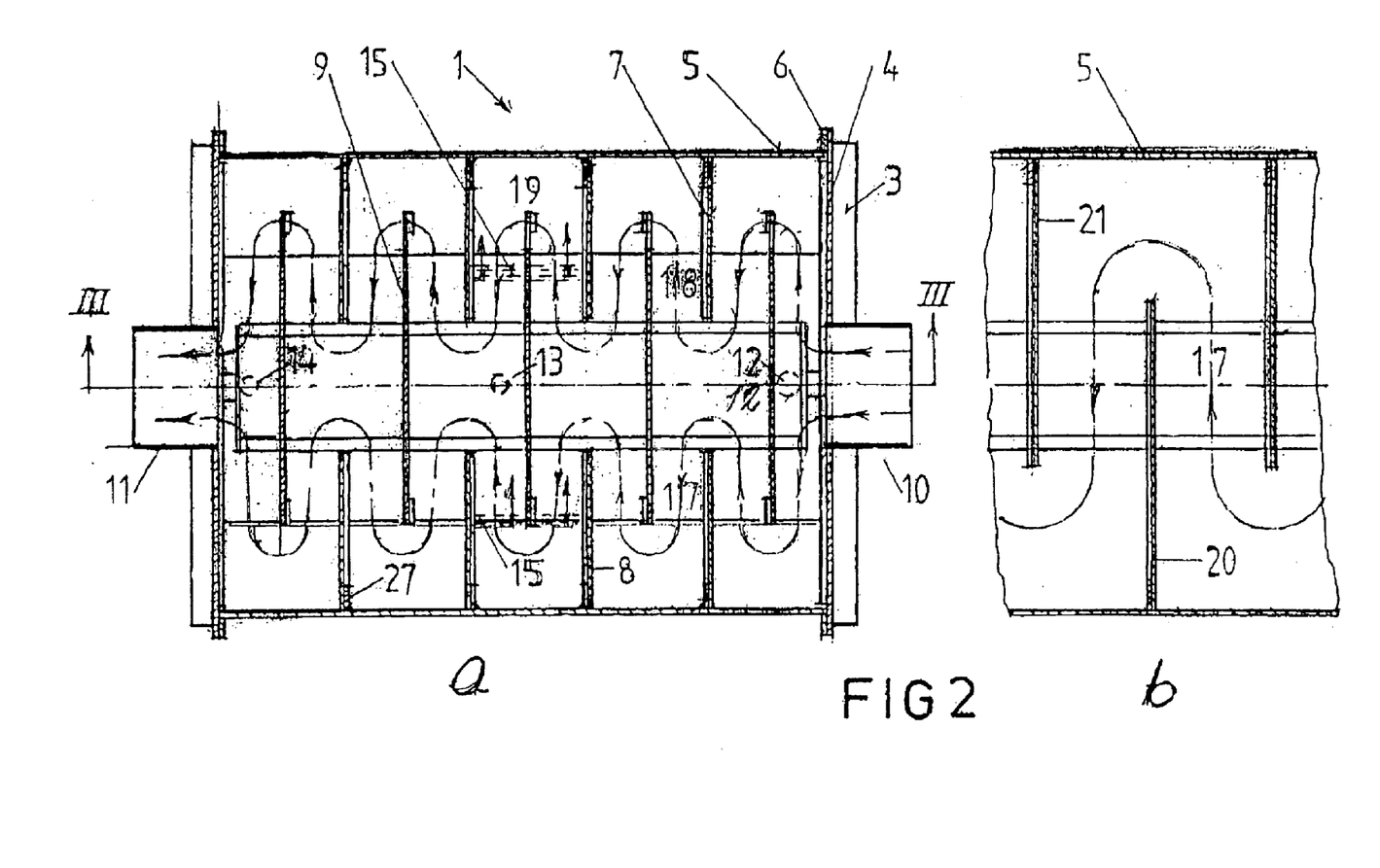
FIG. 2a is a horizontal, longitudinal sectional view of the apparatus shown in FIG. 1.
FIG. 2b is a partial sectional view corresponding to that shown in FIG. 2a, but in a modified embodiment of the invention.

The inner diameter of the peripheral housing wall is preferably selected such that the flow rate of the gas phase or vapour in an inward and an outward direction between the guide plates is about 1 m/sec. If, for example, the diameter of the housing wall is about 1.25 m it will take 0.5 m: 1 m/sec=0.5 sec. for a particle to move outwardly from the centre in a horizontal plane, and in this period the vapour or gas phase several times comes into contact with liquid when passing a carpet-like pattern 15 of liquid droplets. If, for example, the atomising rotor 2 rotates at 9.5 revolutions/sec. and the rotor is provided with 8 pockets the gas phase or vapour will come into contact with a carpet-like droplet pattern 38 times when passing transversely through a passage defined between a pair of guide plates (corresponding to a column bottom). As seen in FIG. 2, the carpet-like patterns 15 of liquid droplets between a pair of guide plates 7 and 8 define gas or vapour volumes, which at first are increased and subsequently are decreased. Therefore, the liquid droplets are forced to penetrate into the gas or vapour volume whereby an almost complete equilibrium between liquid and vapour is obtained. Thus, the distance between two consecutive pairs of guide plates 7 and 8 represents two column bottoms with high efficiency.

Figure 4:
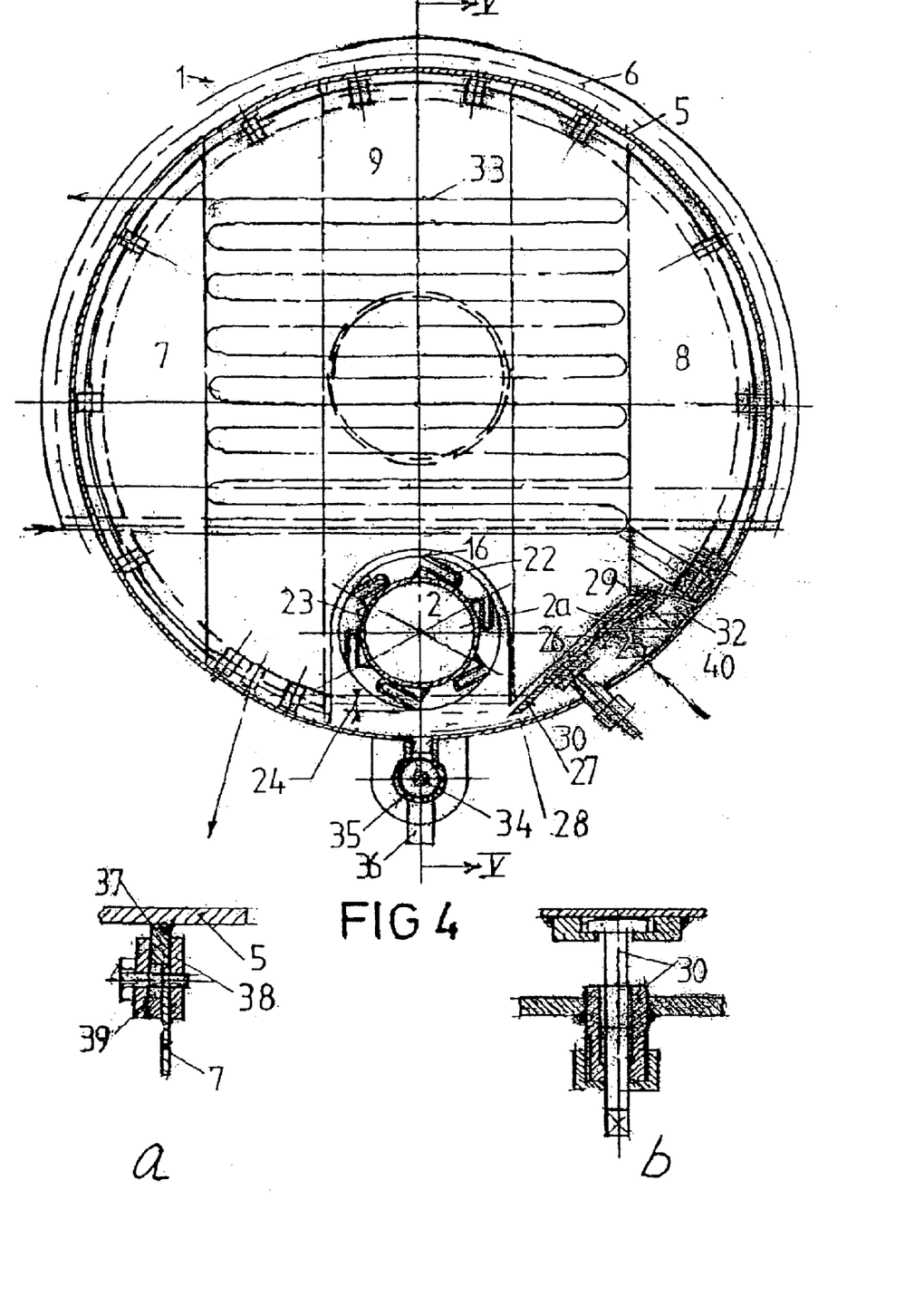

In the embodiment shown in FIG. 2a the droplets forming a pattern 15 starts in the passage 17. In this passage the vapour or gas flows from the centre outwardly towards the peripheral housing wall 5 and is then reversed so as to flow backwards towards the centre on the other side of the rectangular guide plate 9. Thus, the gas or vapour will first flow counter-currently to the liquid thrown out by the rotor 2 and then concurrently when flowing back towards the centre. Therefore, when the gas or vapour is flowing outwardly the patterns 15 of droplets are counteracting the gas flow, while the patterns or droplets will promote the flow of gas or vapour towards the centre of the apparatus. However, because the carpet-like pattern 15 is moving at a velocity considerably higher than the flow rate of the gas of vapour the dragging along of the gas, when flowing concurrently, can compensate for a substantial part of the pressure loss when flowing counter-currently, and the resulting pressure loss for each pair of associated "column bottoms" will therefore be small and the system will be suited for operation in connection with a heat pump.

With the arrangement of guide plates 7–9 described above the vapour is divided into oppositely directed flows 17 and 18 whereby an optimum utilisation of the total volume of the housing 1 is obtained. Alternatively, the guide plates 20 and 21 may be arranged as shown in FIG. 2*b*, whereby a single, undivided flow of vapour or gas, which is alternately counter-current and concurrent with the carpet-like patterns 15 of liquid droplets, is obtained. In each single transverse passage defined between the guide plates 20 and 21 and representing a column bottom the double number of contacts between liquid and vapour is obtained compared to the embodiment described above. However, the apparatus will then be larger. The guide plates 20 and 21 are alternatingly fastened to opposite sides of the peripheral housing wall 5. The guide plates 20 and 21 may have an outline as a segment of a circle so that an axial passage is defined between a vertical, linear edge of each guide plate and an adjacent part of the peripheral housing wall 5. The area of this axial passage is preferably substantially the same as the cross-sectional area of the passage defined between adjacent guide plates 20 and 21.

The guide plates may be releaseably fastened to narrow rings or annular flanges 37, which are welded to the inner surface of the peripheral housing wall 5. In most cases it is desirable to allow fastening of the guide plates with a relatively small axial spacing. This may be obtained by means of a fastening arrangement as that shown in FIGS. 4*a* and 4*b*. The annular flanges 37 welded to the peripheral housing wall 5 have a relatively small radial width and a relatively small thickness, and the outer dimension of the guide plates 7–9 corresponds—with a suitable clearance—to the inner diameter of the welded annular flange 37. The guide plates may be releasably fastened by means of a separate ring 38 having threaded holes formed therein, and releasable fastening members 39 comprising screws or bolts for clamping a guide plate and a fixed annular flange 37 between the separate ring 38 and an oppositely arranged abutment member co-operating with screws or bolts.

As illustrated in FIG. 4, the liquid application device 2*a* comprises a rotor 2 which is made from a central tubular body, and longitudinally extending liquid throwing devices defining the open, U-shaped pockets 22 are welded to the outer surface of the tubular body. The rotor 2 is positioned such that part of each liquid throwing device is dipped into liquid collected at the bottom of the housing or processing chamber. The maximum depth 24 to which the front edge 16 of each liquid throwing device is dipped into the liquid determines the amount of liquid received in each of the U-shaped pockets and also the power necessary for throwing the liquid from the rotor. Such power is also used for controlling the amount of liquid within the apparatus.

The liquid thrown out comes into contact with the gas phase and then hits the inner surface of the peripheral housing wall 5, and the part first being thrown out will then flow down into an upwardly open channel 25 serving to stabilise the transverse liquid flow to the atomising rotor and to allow for the axial liquid flow through the apparatus. The channel 25 is defined between a flap member or plate member 26 extending along the total length of the housing and by the adjacent part of the inner housing wall 5. The lower edge 27 of the flap member is positioned close to the bottom of the housing so as to define an adjustable spacing or slot 28 between the lower edge 27 and the adjacent part of the peripheral wall 5. The upper edge 29 of the flap member 26 is pivotally mounted by means of lugs 32 extending inwardly from the peripheral housing wall 5. The dimensions and the position of the flap member 26 is such that the size of the channel cross section is sufficient to allow axial flow of the liquid through the housing involving a necessary lowering of the liquid level. The liquid level will also vary in response to the adjustment of the width of the slot 28. The width of the slot 28 may be adjusted by means of an adjusting device 30 shown in FIG. 4b. However the adjusting device may also be made in any other suitable manner.

The flow of liquid from the pockets 22 will start as soon as the liquid reaches the front edge 16 of the liquid throwing device. If the pockets 22 are completely filled, the throwing of liquid will start immediately, and the first part will hit the oblique flap member 26. Due to its inertia the liquid will continue to flow over the upper edge 29 of the flap member and down into the channel 25. It is preferred that the rotor pockets 22 be filled only to such an extent that the liquid first being thrown out from the pockets will almost clear the flap member or plate member 26. The width of the slot 28 may be adjusted such that the pockets 22 are not filled too much.

The amount of liquid being atomised varies to a high extent in response to the extent to which the rotor 2 is immersed into the liquid. Thus, a change of the liquid level of only a few millimeters gives rise to a very substantial change of the amount of liquid being atomised. Therefore, the difference in liquid level, which can be tolerated along the length of the housing, is not sufficient to secure the desired axial flow of liquid through the apparatus. This problem is solved by the provision of the channel 25 in which a decreasing liquid level along the length of the channel does not give rise to problems.

Because of the efficient contact between the liquid and the gaseous components an apparatus of the type described is also suitable for use as a gas scrubber. By using a multi-stage apparatus the necessary amount of washing liquid may be considerably reduced. In addition, the gas leaving the last stage comes into contact with fresh washing liquid.

When the apparatus is used as a scrubber it may often be an advantage also to cool the gas flowing through the apparatus. In order to allow such cooling the guide plates may define passages therein for a cooling fluids, or the cooling fluid may be passed through a conduit arrangement 33 mounted on the guide plates. Guide plates having passages formed therein may suitably be used when the difference between the pressure of the cooling fluid and the pressure within the scrubber is moderate. However, when the desired temperature is such that it is necessary to use a refrigerator system including a mechanical heat pump the necessary strength of the heat transmission surface may more easily be obtained by using a conduit arrangement 33. This arrangement is shown only schematically because the need for cooling/heating may vary substantially depending on the problem to be solved. As an example, heat supply may be desirable when a heat pump is used in connection with rectification, wherein the energy supplied as the power consumption of the heat pump may be insufficient to compensate for loss of heat to the ambience, or loss of heat due to lacking condensation heat when an extra fraction is taken out. In such case the conduit arrangement 33 may function as an evaporator and be placed in connection with the first stage, because the vapour developed must contribute to the rectification. In case of gas scrubbing there is preferably a need for cooling and it may then be advantageous to distribute the cooling conduits over a plurality of the guide plates.

Figure 5:
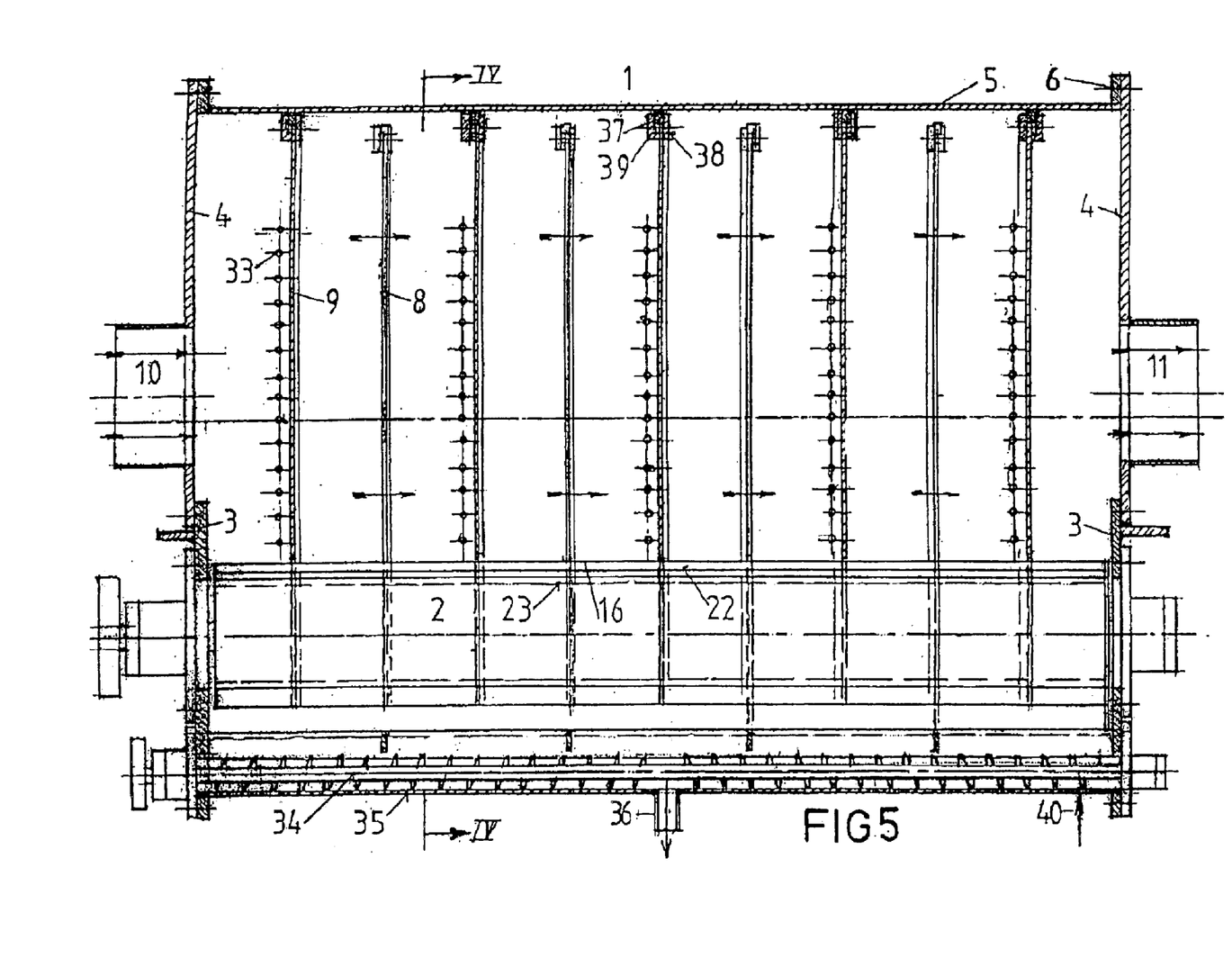
FIG. 5 is a vertical longitudinal section of the apparatus shown in FIG. 4.

When scrubbing a gas flow containing solid particles as well as by treating a mixture of gas and vapour, wherein the vapour components may be condensed by cooling and be precipitated as solids at the lower temperature, problems may arise to obtain an axial transport of the solid particles. Providing a screw conveyor 34 below the bottom of the housing 1 may solve this problem. The screw conveyor 34 is arranged within a tubular housing 35 and is communicating with the lower part of the scrubber housing along the total length thereof. Thus, precipitated or sedimented particles or salts may move into the conveyor housing 35 and be transported to an outlet 36 for solids by means of the slowly rotating conveyor screw 34. The arrangement operates more efficiently when the mixture of washing liquid and solid particles is removed at the lowest possible temperature. The maximum heat transfer will take place at the inlet 10 for the hot gas. Furthermore, it is important that scrubbing takes place with washing liquid being as clean as possible at the outlet 11 for the cleaned gas. Therefore the best position for the outlet 36 for liquid and solid particles is about the middle of the apparatus or housing. Because minor precipitation may take place also in the later half of the housing the pitch of the conveyor screw 34 must be oppositely directed. In FIG. 5 the washing liquid is supplied to the apparatus at 40.

What is claimed is:

1. An apparatus for rectification of liquid mixtures or for scrubbing of gases, said apparatus comprising an elongated processing chamber extending in a substantially horizontal direction, means for supplying liquid into the processing chamber at a first end thereof, means for discharging a liquid from the processing chamber at an opposite, second end thereof, liquid application means arranged at the bottom of the processing chamber and extending along at least a major part of the length of the chamber for repeatedly throwing supplied liquid transversely to the longitudinal axis of the processing chamber, means for supplying gas into the processing chamber and means for discharging gas from the processing chamber so as to obtain a generally counter-current movement of liquid and gas through the processing chamber, the liquid application means comprising a rotor defining liquid collecting pockets or chambers opening in the direction of rotation, wherein the liquid application means further comprise an upwardly open liquid channel extending axially along the lower part of the processing chamber and having opposite ends, which are in communication with the liquid supplying means and the liquid discharging means, respectively, at least the lower part of the rotor being arranged within the liquid channel, wherein the liquid application means comprise a liquid receiving chamber or channel for receiving liquid flowing downwards along the inner peripheral wall of the processing chamber, the receiving chamber communicating with the liquid channel via an adjustable, longitudinally extending opening or slot, wherein the liquid receiving chamber is defined between the peripheral inner wall of the processing chamber and a flap or plate member being pivotal about a longitudinal axis so as to allow adjustment of a space defined between the lower edge of the flap member and the adjacent part of the inner wall of the processing chamber.

2. An apparatus according to claim 1, wherein the liquid collecting pockets or chambers have a U-shaped cross-section opening in direction of rotation and being adapted to throw the liquid from said opening so as to form rotating carpet-like patterns of droplets extending from the outer edge of the opening of each said pocket or chamber towards the inner wall of the processing chamber.

3. An apparatus according to claim 1, wherein the processing chamber is defined by a peripheral wall and a pair of opposite end walls, at least one of the end walls comprising a releasable end wall part covering an opening, which is defined in the upper part of the end wall, said opening having dimensions sufficient to allow insertion of guide plates into the chamber through such opening.

4. An apparatus according to claim 1, wherein the releasable end wall part is in the form of a cover with a flange connected to the end wall by screws or bolts.

5. An apparatus according to claim 1, wherein the processing chamber is divided into interconnected sections or stages by means of a plurality of guide plates each extending across a major part of the cross-section of the processing chamber, the guide plates formed and arranged so as to force gas flowing from the gas supplying means of the gas discharge means to follow a tortuous path and to flow in the opposite, transverse directions.

6. An apparatus according to claim 4, wherein the inner peripheral wall of the processing chamber comprises means for releasable fastening said guide plates at any of axially spaced, predetermined positions.

7. An apparatus according to claim 5, wherein the releasable fastening means comprises annular flanges fastened to and extending radially inwardly from said inner peripheral chamber wall.

8. An apparatus according to claim 1, wherein at least some of the guide plates define or comprise conduits for a heating or cooling fluid.

9. An apparatus according to claim 1, further comprising conveyor means for removing solid matter separated in the processing chamber from the bottom part thereof.

10. An apparatus according to claim 8, wherein the conveyor means comprise a screw conveyor including a cylindrical housing communicating with the lower part of the processing chamber.

11. An apparatus for rectification of liquid mixtures or for scrubbing of gases, said apparatus comprising an elongated processing chamber extending in a substantially horizontal direction, means for supplying liquid into the processing chamber at a first end thereof, means for discharging a liquid from the processing chamber at an opposite, second end thereof, liquid application means arranged at the bottom of the processing chamber and extending along at least a major part of the length of the chamber for repeatedly throwing supplied liquid transversely to the longitudinal axis of the processing chamber and means for supplying gas into the processing chamber and means for discharging gas from the processing chamber so as to obtain a generally counter-current movement of liquid and gas through the processing chamber, the processing chamber being defined by a peripheral wall and a pair of opposite end walls, at least one of the end walls comprising a releasable end wall part covering an opening, which is defined in the upper part of the end wall.

12. An apparatus for rectification of liquid mixtures or for scrubbing of gases, said apparatus comprising an elongated processing chamber extending in a substantially horizontal direction, means for supplying liquid into the processing chamber at a first end thereof, means for discharging a liquid from the processing chamber at an opposite, second end thereof, liquid application means arranged at the bottom of the processing chamber and extending along at least a major part of the length of the chamber for repeatedly throwing supplied liquid transversely to the longitudinal axis of the processing chamber and means for supplying gas into the processing chamber and means for discharging gas from the processing chamber so as to obtain a generally counter-current movement of liquid and gas through the processing chamber, the processing chamber being divided into interconnected sections or stages by means of a plurality of guide plates each extending across a major part of the cross-section of the processing chamber, wherein at least some of the guide plates define or comprise conduits for a heating or cooling fluid.

13. An apparatus for rectification of liquid mixtures or for scrubbing of gases, said apparatus comprising an elongated processing chamber extending in a substantially horizontal direction, a liquid supplying device extending to the processing chamber at a first end thereof, a liquid discharging device extending from the processing chamber at an opposite, second end thereof, a liquid application device arranged at the bottom of the processing chamber and extending along at least a major part of the length of the chamber for repeatedly throwing supplied liquid transversely to the longitudinal axis of the processing chamber a gas supplying device for supplying gas into the processing chamber and a gas discharging device for discharging gas from the processing chamber so as to obtain a generally counter-current movement of liquid and gas through the processing chamber, the liquid application device comprising a rotor defining liquid collecting pockets or chambers opening in the direction of rotation, wherein the liquid application device further comprises an upwardly open liquid channel extending axially along the lower part of the processing chamber and having opposite ends, which are in communication with the liquid supplying device and the liquid discharging device, respectively, at least the lower part of the rotor being arranged within the liquid channel, wherein the liquid application device comprises a liquid receiving chamber or channel for receiving liquid flowing downwards along the inner peripheral wall of the processing chamber, the receiving chamber communicating with the liquid channel via an adjustable, longitudinally extending opening or slot, wherein the liquid receiving chamber is defined between the peripheral inner wall of the processing chamber and a flap or plate member being pivotal about a longitudinal axis so as to allow adjustment of a space defined between the lower edge of the flap member and the adjacent part of the inner wall of the processing chamber.

* * * * *